US012363518B2

(12) United States Patent
Ballhatchet et al.

(10) Patent No.: US 12,363,518 B2
(45) Date of Patent: Jul. 15, 2025

(54) INTERACTIVE APPARATUS

(71) Applicant: YOTO LIMITED, Greater London (GB)

(72) Inventors: Thomas Ballhatchet, Greater London (GB); Filip Denker, Greater London (GB); Benjamin Drury, Greater London (GB)

(73) Assignee: YOTO LIMITED, Greater London (GB)

( * ) Notice: Subject to any disclaimer, the term of this patent is extended or adjusted under 35 U.S.C. 154(b) by 313 days.

(21) Appl. No.: 17/618,411

(22) PCT Filed: Jun. 12, 2020

(86) PCT No.: PCT/GB2020/051417
§ 371 (c)(1),
(2) Date: Dec. 10, 2021

(87) PCT Pub. No.: WO2020/249959
PCT Pub. Date: Dec. 17, 2020

(65) Prior Publication Data
US 2022/0233968 A1  Jul. 28, 2022

(30) Foreign Application Priority Data

Jun. 13, 2019  (GB) ...................... 1908525

(51) Int. Cl.
*H04W 4/80* (2018.01)
*A63H 30/04* (2006.01)
(Continued)

(52) U.S. Cl.
CPC .............. *H04W 4/80* (2018.02); *A63H 30/04* (2013.01); *G06F 3/01* (2013.01); *H04N 21/41265* (2020.08); *A63H 2200/00* (2013.01)

(58) Field of Classification Search
CPC ... H04W 4/80; H04N 21/41265; A63H 30/04; A63H 2200/00; G06F 3/01
See application file for complete search history.

(56) References Cited

U.S. PATENT DOCUMENTS 5,377,269 A  12/1994  Heptig et al.
6,171,168 B1  1/2001  Jessop
(Continued)

FOREIGN PATENT DOCUMENTS

CN  109675326 A  4/2019
DE  102011056420 A1  6/2013
(Continued)

OTHER PUBLICATIONS

Pontes Lara et al, "Security in Smart Toys: A Systematic Review of Literature", Jun. 7, 2019 (Jun. 7, 2019), Robocup 2008: Robocup 2008: Robot Soccer World Cup XII; [Lecture Notes in Computer Science; Lect.Notes Computer], Springer International Publishing, Cham, pp. 28-38, XP047513092, ISBN: 9783319104034, the whole document (12 pages).

(Continued)

*Primary Examiner* — Dmitry Suhol
*Assistant Examiner* — Ankit B Doshi
(74) *Attorney, Agent, or Firm* — Procopio, Cory, Hargreaves & Savitch LLP (57) ABSTRACT

An interactive apparatus, the apparatus including: a control device for controlling the interactive apparatus; input device(s) for providing input(s) and output device(s) for providing audio and/or visual outputs, wherein the control device is configured for receiving media and providing the media to the output device(s) to provide audio and/or visual outputs associated with the media; a communication device for receiving a communication input for processing by the control device, the communication device including one or
(Continued)

more of: a microphone, a camera, and a communication interface for communication with electronic or computer devices over a wireless communication protocol; wherein the communication device is only permitted to be activated by an actuation device being placed into close proximity to or physical contact with the interactive apparatus.

23 Claims, 3 Drawing Sheets

(51) Int. Cl.
*G06F 3/01* (2006.01)
*H04N 21/41* (2011.01)

(56) References Cited

U.S. PATENT DOCUMENTS

| | | | |
|---|---|---|---|
| 7,261,612 | B1 | 8/2007 | Hannigan et al. |
| 8,515,092 | B2 | 8/2013 | Rucker |
| 10,286,333 | B2 | 5/2019 | Fassbender et al. |
| 10,960,320 | B2 | 3/2021 | Fassbender et al. |
| 11,045,738 | B1* | 6/2021 | Unruh .................... A63F 13/235 |
| 11,141,669 | B2* | 10/2021 | Candelore ................ A63H 3/28 |
| 2005/0273845 | A1 | 12/2005 | Urano et al. |
| 2006/0003664 | A1 | 1/2006 | Yeh |
| 2006/0035707 | A1 | 2/2006 | Nguyen et al. |
| 2008/0162925 | A1 | 7/2008 | Okaya |
| 2010/0160054 | A1 | 6/2010 | Henry |
| 2012/0046102 | A1 | 2/2012 | Tully |
| 2013/0055001 | A1 | 2/2013 | Jeong et al. |
| 2013/0059284 | A1 | 3/2013 | Giedgowd, Jr. et al. |
| 2014/0120832 | A1 | 5/2014 | Confer et al. |
| 2014/0263648 | A1 | 9/2014 | Van Bosch et al. |
| 2014/0310186 | A1* | 10/2014 | Ricci ...................... H04W 4/80 705/302 |
| 2016/0012624 | A1 | 1/2016 | Taki et al. |
| 2016/0175723 | A1* | 6/2016 | Boeckle .................. A63H 3/28 446/72 |
| 2018/0272240 | A1* | 9/2018 | Soudek .................... A63H 3/28 |
| 2018/0314416 | A1* | 11/2018 | Powderly ................ G06F 3/016 |
| 2018/0361263 | A1* | 12/2018 | Boeckle ............... A61B 5/0002 |
| 2019/0022546 | A1 | 1/2019 | Fassbender et al. |
| 2020/0249763 | A1 | 8/2020 | Moritani |
| 2021/0255746 | A1 | 8/2021 | Hu et al. |

FOREIGN PATENT DOCUMENTS

| | | |
|---|---|---|
| EP | 2363776 A1 | 9/2011 |
| FR | 2834913 A1 | 7/2003 |
| WO | 2010057249 A1 | 5/2010 |
| WO | 2017100821 A1 | 6/2017 |

OTHER PUBLICATIONS

Rivera Diego et al, "Secure Communications and Protected Data for a Internet of Things Smart Toy Platform", IEEE Internet of Things Journal, IEEE, USA,vol. 6, No. 2, Apr. 1, 2019 (Apr. 1, 2019), p. 3785-3795, XP011723714.

International Search Report and Written Opinion corresponding to International Application No. PCT/GB2020/051417, dated Sep. 9, 2020 (9 pages).

International Preliminary Report on Patentability corresponding to International Application No. PCT/GB2020/051417, dated Dec. 14, 2021 (6 pages).

Kshetri Nir et al, "Cyberthreats under the Bed", May 1, 2018 (May 1, 2018), vol. 51, No. 5, URL: https://doi.org/10.1109/MC.2018.2381121, the whole document (6 pages).

Szcys, Mike, "Audiobook Player Used Only NFC Tags for Control", URL: https://www.Hackday.com, Mar. 4, 2013 including comments and YouTube Video "Zero Button Audiobook Player", URL: https://www.youtube.com/watch?v=PfXmEMPt9ws&t=1s, Mar. 3, 2013. (11 pages).

Szcys, M., "One-Button Audiobook Player Made From a Raspberry PI", URL: https://www.Hackday.com, including comments, Nov. 1, 2012.

Skål, "Playful Research Tangible Interface", http://old.react-hub.org.uk/objects-sandbos/skal/, 2007.

Teresa Denker., "10 reasons I want my children to grow up away from TV, computer and tablets", Oct. 31, 2017 (Oct. 31, 2017), Retrieved from the Internet: URL: "https://www.yotoplay.com/blogs/yoto-journal/10-reasons-i-want-my-children-to-grow-up-away-from-tv-computer-and-tablets", XP002800435, [retrieved on Sep. 23, 2020], whole document (6 pages).

Shivali Best, "Worried your child spends too much time in front of a screen? £130 'clever speaker' Yoto helps develop early skills using audio content", Oct. 31, 2017 (Oct. 31, 2017), Retrieved from the Internet: URL: "https://www.dailymail.co.uk/sciencetech/article-5036131/Clever-speaker-helps-develop-skills-using-audio.html", XP002800436, retrieved on Sep. 23, 2020], whole document (7 pages).

United Kingdom Office Action corresponding to United Kingdom Application No. 1908525.7, dated Nov. 24, 2022 (2 pages).

European Office Action corresponding to European Application No. 20734268.4, dated Jan. 8, 2024 (Jan. 8, 2024), 4 pages.

* cited by examiner

INTERACTIVE APPARATUS

CROSS REFERENCE TO RELATED APPLICATION(S)

This application is a National Stage Application filed under 35 U.S.C. § 371 of PCT International Patent Application Serial No. PCT/GB2020/051417, entitled "AN INTERACTIVE APPARATUS", and filed on Jun. 12, 2020, which claims the benefit of Application No. 1908525.7, entitled "An interactive apparatus", and filed on Jun. 13, 2019, each of which is expressly incorporated by reference herein in its entirety.

This invention relates to an interactive apparatus.

Interactive apparatus are known for interaction by a user to engage with media including images, video and audio. Interactive apparatus are also known which have communication interfaces to permit wireless control of the apparatus, and/or transmission of multimedia content to the apparatus.

More recently, interactive apparatus configured as toys for children have become available. An attraction of such interactive apparatus is that they permit an active engagement of a child with media to create a play activity as opposed to a passive engagement such as a child simply watching a video or the like. Such apparatus may include media being stored on physical objects configured as cards, and figurines which include wireless communication tags such as NFC and/or RFID that can be read by the apparatus to play the media. A child may thus operate with the apparatus to engage with the media to curate their own experiences. Such an apparatus may include a communication interface for communication with computing equipment over a communication network, e.g. Bluetooth and the internet, to permit the transfer of media and/or control of the apparatus, e.g. to stream multimedia content to the apparatus. For such an apparatus, the media may not be stored on the physical objects but instead the physical objects may have media identifier keys, e.g. URL addresses, for downloading an associated media to the apparatus. Apparatus may include communication devices such as microphones and cameras to permit a child to transmit, receive and/or record audio/video content through the apparatus. This increases the creativity of the apparatus and stimulates further interaction opportunities for a child.

A concern associated with the use of such interactive apparatus is that they may be subject to unauthorised access that may allow a remote user to control or otherwise interfere with the apparatus in a way that intrudes on the privacy of the user. In particular, in the context of a child user, parents may have safety concerns if a remote user were to obtain authorised access to a microphone, camera or communication interface of the apparatus.

The present invention seeks to provide an improved interactive apparatus with respect to the prior art interactive apparatus.

According to an aspect of the invention we provide an interactive apparatus, the apparatus including:
  a control device for controlling the interactive apparatus;
  input device(s) for providing input(s) and output device(s) for providing audio and/or visual outputs, wherein the control device is configured for receiving media and providing the media to the output device(s) to provide audio and/or visual outputs associated with the media;
  a communication device for receiving a communication input for processing by the control device, the communication device including one or more of: a microphone, a camera, and a communication interface for communication with electronic or computer devices over a communications network;
  wherein the communication device is only permitted to be activated by an actuation device being placed into close proximity to or physical contact with the interactive apparatus, or being detected by the apparatus.

When the interactive apparatus is in an operational state, the communication device may only be permitted to be activated by the actuation device being placed into close proximity to or physical contact with the interactive apparatus or being detected by the apparatus.

The actuation device may be for permitting activation of the communication device and operation of the rest of the interactive apparatus may be otherwise independent of the actuation device.

The interactive apparatus may include a detection device for detecting the actuation device and/or the actuation device.

The communication device may only be permitted to be activated in response to the detection device detecting the actuation device, e.g. detecting its presence, or that the actuation device is in close proximity to or in physical contact with the interactive apparatus.

The communication device may not be permitted to be activated in response to the detection device detecting the actuation device is not in close proximity to or not in physical contact with the interactive apparatus.

The actuation device may include a passive or active wireless communication tag for detection by the detection device, optionally or preferably the wireless communication tag is a Near Field Communication Tag (NFC Tag) or a Radio Frequency Identification Tag (RFID Tag)

The detection device may include a magnetic field sensor, and the actuation device includes a magnet for detection by the magnetic field sensor when the actuation device is placed into close proximity to or physical contact with the interactive apparatus.

The interactive apparatus may include a switch device operable between a first state to activate the communication device and a second state to deactivate the communication device.

The switch device may be a reed switch which is operable by the actuation device being in close proximity to or engagement with the interactive apparatus.

The switch device may be operable by the control device.

The input device(s) may include a reading device for reading a media identifier key present on a media object when said media object is placed into close proximity to or physical contact with the interactive apparatus.

The control device may be configured to use the media identifier key to obtain an associated media and provide said associated media to the output device(s).

The associated media may be stored on a computer readable medium of the interactive apparatus and/or may be stored on a remote computer from which the associated media may be downloaded.

The interactive apparatus may include a housing, wherein the housing includes a recess for receiving the actuation device therein.

The recess may be provided on a surface of the housing which, in use, faces a user.

The interactive apparatus may include a computer readable medium for storing a communication input received from the communication device.

The computer readable medium may be a removable Secure Digital (SD) card.

The output device(s) may include a visual display and/or a speaker.

The interactive apparatus may include contact elements for engaging with corresponding contact elements on the actuation device to close a circuit such that the communication device is permitted to be activated.

The interactive apparatus may include a user operable device operable to activate and/or deactivate the communication device.

Embodiments of the invention will be set out below by way of example only with reference to the accompanying figures, of which.

Figure 1:
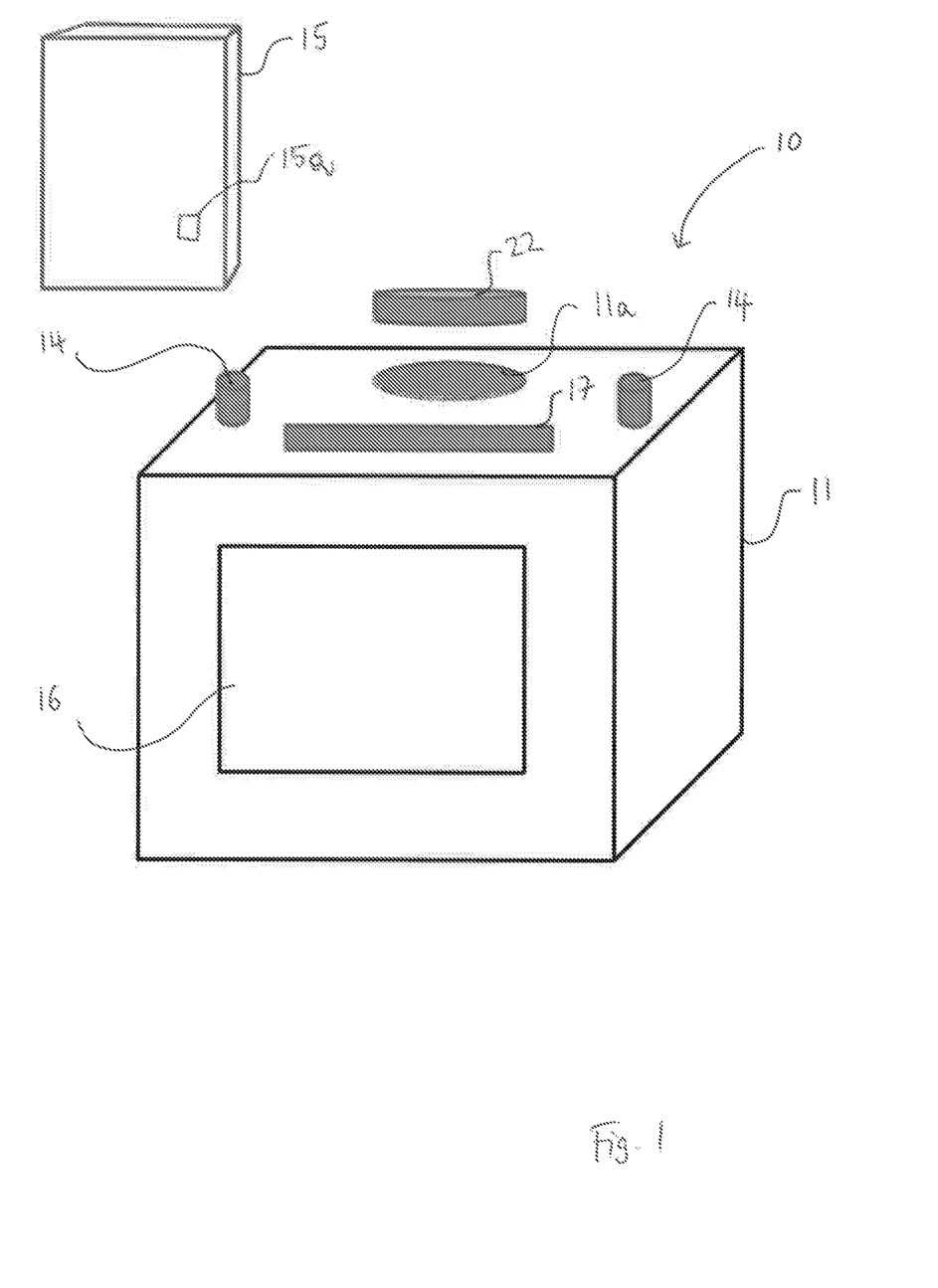
FIG. 1 is a perspective view of an interactive apparatus in accordance with embodiments of the present invention.

With reference to FIG. 1, an interactive apparatus 10 in accordance with an embodiment of the present invention is shown. In embodiments, the interactive apparatus may be a portable device. In embodiments, the interactive apparatus may be configured as a smart speaker or a toy for a child. In the following description, one or more of the features may be employed in connection with such interactive apparatus in a way that will be readily appreciated by the skill person.

Figure 2:
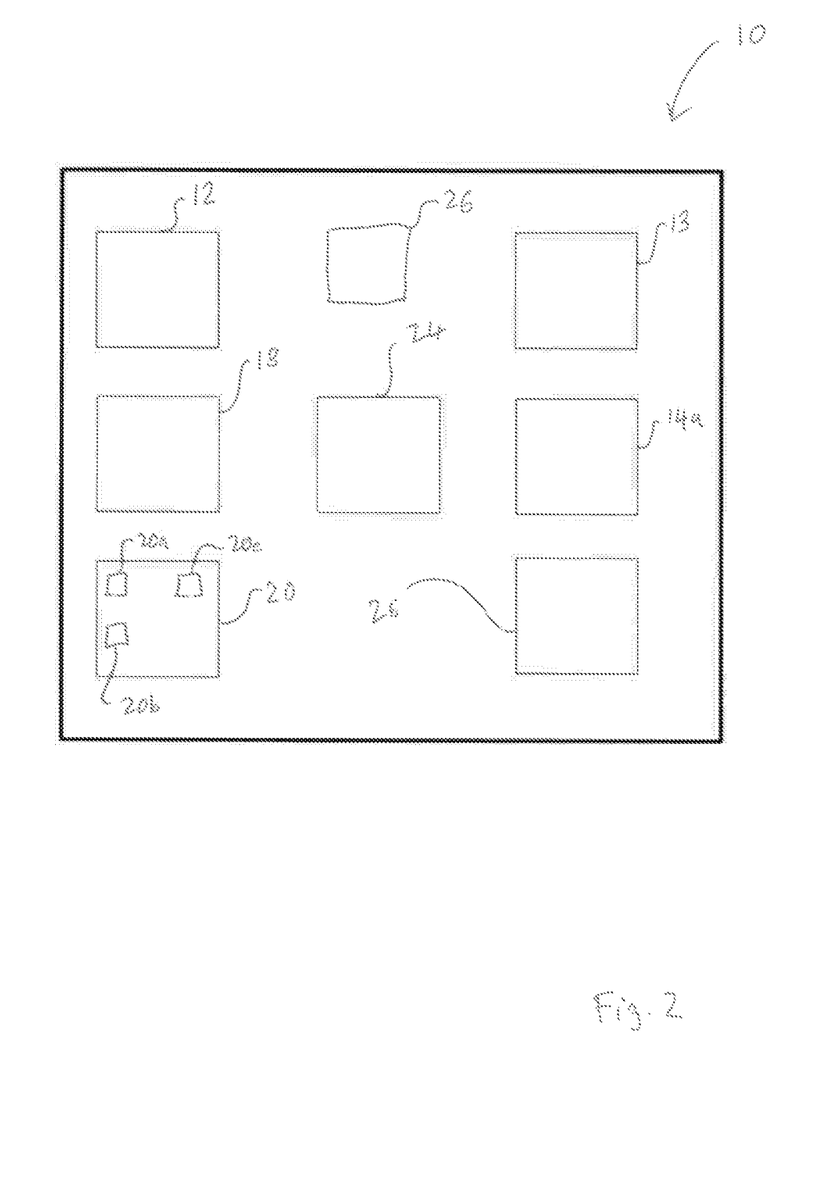
FIG. 2 is a schematic diagram showing components of an interactive apparatus in accordance with embodiments of the present invention.

With reference to FIGS. 1 and 2, interactive apparatus 10 includes a body 11 which has therein a control device 12, input devices 14 for providing inputs, output devices 16, 18, and communication devices 20 for receiving communication inputs. The interactive apparatus 10 may have a battery to provide power thereto and/or may be connected to a mains supply.

The control device 12 may be in the form of a processor, a printed circuit board (PCB) and/or other control device configured to control the various components of the interactive apparatus 10. The interactive apparatus 10 may have a storage medium including instructions, e.g. software modules and code, for processing by the control device 12 to effect operation of the interactive apparatus 12. The interactive apparatus 12 may have a SD card device 13 for reading data from, and, storing data on, a SD card.

Output device 16 may include a display such as a LED display or the like to display visual images/graphics. Output device 18 may include a speaker for producing audio. Other forms of output devices may be used for outputting media in a manner that would be readily appreciated by the skilled person.

Input devices 14 may include user operable buttons, a touch screen or other user operable devices for providing user inputs to the interactive apparatus 10 to interact with, and/or provide user commands, to the interactive apparatus 10. The user inputs may be for turning the apparatus 10 on and off, adjusting the properties of output devices 16, e.g. volume, display settings, and controlling the apparatus 10 to process media as will be described. In embodiments, the input devices 14 may include portable devices that are connectable via a wired or wireless connection to the interactive apparatus 10. Such input devices 14 may include cellular telephones, computer tablets or computers.

The input devices 14 may be operated to cause the interactive apparatus 10 to receive media via a media object 15, associate media to the media object 15, and/or permit user interaction/engagement with said media. Media object 15 may be a physical object in the form of a card, figurine or the like, when the interactive apparatus 10 is configured as a toy. The media object 15 may include a wireless communication device to permit communication between the media object 15 and the interactive apparatus 10.

The control device 12 may be configured for receiving media and providing the media to the output devices 16, 18 to provide audio and/or visual outputs associated with the media, e.g. generate sounds and visual images on a user operating the input devices 14.

Input devices 14 may include a reading device 14a for reading the media object 15 when the media object 15 is placed in close proximity to or physical contact with the interactive apparatus 10. Reading device 14a may include a wireless communication reader and media object 15 may include a wireless communication tag. In embodiments, the tag may include media, e.g. audio and visual content in a coded format, and which media can be read by the reading device 14a and converted by the control device 12 into audio and/or visual outputs for outputting by the output devices 16, 18. In embodiments, the tag may include a media identifier key 15a. The media identifier key 15a may be used by the control device 12 to obtain an associated media. In embodiments, the media identifier key 15a may be in the form of a URL which can be read by the reading device 14a and provided to the control device 12 for downloading/streaming the associated media from a remote computer, e.g. a server in the cloud, as will be described. In embodiments, the media identifier key 15a may be used by the control device 12 to obtain an associated media stored at the interactive apparatus 10 as will be described. Examples of wireless communication tags include passive and active Near Field Communication tags (NFC Tag) and/or a Radio Frequency Identification tags (RFID tag). Examples of media may include an audio book or music which may be played by the interactive apparatus 10, graphics/animations for display by the interactive apparatus 10, and/or a combination of graphics/animation/audio that is produced by the interactive apparatus 10 in response to user inputs at the interactive apparatus 10. The interactive apparatus 10 may include a formation or a designated surface 17 which must receive the media object 15 to effect reading of, and/or transfer of data with, the media object 15. For example, the formation or designated surface 17 is sufficiently close and/or in contact with the reading device 14a to ensure that the media object 15 may be read, e.g. due to the range of the wireless communication tag where it is employed for embodiments. The formation 17 may be configured as a slot into which the media object 15 may be inserted, e.g. where the media object 15 is provided as a card.

Communication devices 20 may include a microphone 20a and a camera 20b. The communication devices 20 may be on-board devices within the interactive apparatus 10, e.g. the microphone may be an on-board device, the camera 20b may be an on-board device.

In embodiments, the communication devices 20 may include a communication interface 20c for communication with electronic/computer devices (e.g. a computer, cellular/smart phone, tablet and the like) over a communications network, e.g. a wireless network, the internet or wireless communication protocols such as Bluetooth. The communication interface may be an on-board device. In such embodiments, the communication interface 20c may only be activated if the actuation device 22 is in close proximity to or in engagement with the apparatus 10.

The interactive apparatus 10 may be operated by the user to store, record and/or transmit audio, video and/or other information via the communication device 20 being activated. In embodiments, interactive apparatus 10 may be operated by a user so that the communication devices 20 may record and store user created media at the interactive apparatus 10, e.g. on a SD card. In embodiments, interactive apparatus 10 may have the means to create a media identifier key and store said media identifier key to the media object 15 via a wireless communication tag on the media object 15. This is so that the associated media recorded and stored at the interactive apparatus 10 is obtained by the control device 12 when the media identifier key on media object 15 is read by the reading device 14a. In embodiments, the interactive apparatus 10 may be operable by a user to create a media identifier key which the reading device 14a may store on a blank media object to associate with media which is external of the interactive apparatus 10. For the example, a user may have media on his or her cellular telephone, or media stored on a remote computer, e.g. a server in the cloud, that her or she can have made associated with the blank media object by the user operating the interactive apparatus 10 to create a media identifier key that directs the control device 12 to the media, e.g. through a URL address. In embodiments, the interactive apparatus 10 may have a user operable device operable to activate/deactivate the communication devices 20. The user operable device may be a manual switch, e.g. one of input devices 14, or an electronic switch that is electronically operated by the control device 12 in response to user instructions received by the interactive apparatus 10. Such user instructions may be received via a device connected to, or in wireless communication, with the interactive apparatus 10, e.g. a cellular telephone or a computer tablet.

Interactive apparatus 10 may be configured such that the communication device 20 is only permitted to be activated by an actuation device 22 being placed in close proximity to or physical contact with the interactive apparatus 10 or the actuation device 22 being detected as present by the interactive apparatus 10. For example, in embodiments, whilst the interactive apparatus 10 is in an operational state, i.e. it is in an "on" state, the communication device 20 is only permitted to be activated by the actuation device 22 being placed into close proximity to or physical contact with the interactive apparatus 10 or being detected by the apparatus 10. In embodiments, the apparatus 10 may be arranged such that the actuation device 22 is for permitting activation of the communication device 20 and operation of the rest of the interactive apparatus 10 is otherwise independent of the actuation device 22. Thus, the apparatus 10 may be otherwise operational so that the various output/input devices are working as normal, but the communication device 22 cannot be activated unless the actuation device 22 is placed in close proximity to or physical contact with the apparatus 10 or the device 22 being detected by the apparatus 10.

Activation of the communication device 20 refers to the communication device 20 being made operational such that the control device 12, may, for example, operate the communication device 20 to record sound, video or receive/transmit data as the case may be. If the actuation device 22 is not present then the communication device 20 cannot be turned "on" In embodiments, body 11 may have a recess 11a for receiving the actuation device 22 therein. In embodiments, the recess 11a may be provided on a surface of the body 11 which, in use, faces a user.

The actuation device 22 may take various forms.

The actuation device 22 may be in the form of a card or coin shaped object that is received by the recess 11a or may be placed on or near a designated surface of the body to ensure the actuation device 22 interacts with the interactive apparatus 10 to permit actuation of the communication devices 20.

In embodiments, the actuation device 22 may cause automatic activation of one or more of the communication devices 20. For example, where the communication device is a microphone or camera, the interactive apparatus 10 may be configured to automatically activate the microphone to commence recording or the camera to commence recording or capture of images.

In embodiments, the interactive apparatus 10 may include a detection device 24 for detecting the actuation device 22 and the interactive apparatus 10 may be configured such that the communication devices 20 are only permitted to be activated in response to the detection device 24 detecting the actuation device 22 is in close proximity to or in physical contact with the interactive apparatus 10.

In embodiments, there may be a plurality of actuation devices for corresponding ones of the communication devices 20.

Detection device 24 may include a reader and the actuation device 22 may include a passive or active wireless communication tag, e.g. NFC tag or RFID tag that may be scanned by the reader. The control device 12 may be configured to only permit activation of the communication devices 20 if it receives a positive signal from the detection device 24 indicating that the actuation device 22 is in close proximity to or engagement with the interactive system 10. For example, there may be a control or power supply circuit for the communication devices 20 that may be isolated by the control device 12 from the rest of the interactive apparatus 10 such that the communication devices 20 are inhibited from activation unless the circuit is connected by the control device 12. In embodiments, the actuation device 22 may have one or more actuation identifier keys 23a, 23b, 23c stored on the wireless communication tag associated with the respective communication devices 20. The control device 12 may read the actuator identifier keys 23a, 23b, 23c to identify which of the communication devices 20 can be permitted for activation. In embodiments, the actuation device 22 may be combined with the media object 15. For example, the media object 15 may include one or more actuation identifier keys 23a, 23b, 23c.

For illustration, for embodiments having a user operable device, e.g. as one of input devices 14, for activating one or more of the communication devices 20, the one or more communication devices 20 cannot be activated even if the user operable device has been operated by a user unless the detection device 24 has determined that the actuation device 22 is in close proximity to/engagement with the interactive apparatus 10.

The interactive apparatus 10 may be configured so that, if a media object 15 is being used for the first time with the interactive apparatus 10, the control device 12 will use the media identifier key 15a present on the media object 15 to obtain the associated media by downloading it from a remote computer, e.g. a server in the cloud, provided that the actuation device 22 is present for permitting operation of the communication interface 20c. The associated media is then stored on the SD card 13 and the control device 12 stores information on the storage medium of the interactive apparatus 10 to indicate that the associated media has been stored on the SD card 13. If the same media object 15 is then used again, the control device 12 on reading the media identifier key 15a checks the storage medium and establishes that the associated media is present on the SD card 13. The control device 12 then obtains the associated media from the SD card 13 rather than downloading it. In other cases, the media identifier key 15a may indicate that only streaming of the associated media is permitted, in which case the control device 12 does not store the associated media on the SD card 13.

Operation of the interactive apparatus 10 will now be described. The user turns on the interactive apparatus 10 by operating one of the input devices 14, e.g. pressing a user operable button thereof, placing the media object 15 in or on the formation/designated area 17, or bringing the media object 15 near the formation/designated area 17 which is then read by the reading device 14*a* to cause the interactive apparatus 10 to turn on. The control device 12 then performs the associated operations/instructions to bring the interactive apparatus 10 into a ready state for operation by the user.

In the case for which the apparatus 10 was turned on by operating one of the input devices 14, if the user wishes to interact with media from a media object 15, the user may place the media object 15 in or on the formation/designated area 17, or bring the media object 15 near the formation/designated area 17 and the reader device 14*a* scans the media object 15 via the object's associated wireless communication tag. The control device 12 may then obtain the media identifier key 15*a*. The control device 12 checks whether or not the associated media has previously been accessed, and/or whether the associated media is only permitted for streaming. The first of these may be done by the control device 12 comparing metadata and/or filenames of the associated media against media stored on the SD card 13.

Assuming the associated media has already been accessed and so is stored on the SD card 13, the control device 12 obtains the associated media from the SD card 13 The control device 12 processes the media and provides the same as signals for the output devices 16, 18 to output audio, images, video, graphics and the like associated with the media. The control device 12 may be configured to process the media for provision to the output devices 16, 18 on the user operating input devices 14. The media object 15 may then be removed from the formation/designated area 17 as the control device 12 has obtained the associated media.

The above operations occur regardless of whether the actuation device 22 is present or not, i.e. they are independent of the actuation device 22.

If the user wishes to activate one of the communication devices 20, e.g. microphone 20*a*, the user operates the relevant one of the input devices 14 accordingly. The control device 12 receives the associated input and, before activating the microphone 20*a*, first communicates with the detection device 24 to determine whether the actuation device 22 has been detected. If the determination is negative, the control device 12 will not activate the microphone 20*a*. If the user has placed the actuation device 22 in close proximity to/engagement with the apparatus, a positive determination will be made and the control device 12 will activate the microphone 20*a*. In embodiments, the actuation device 22 may be inserted/placed on the formation/designated area 17 to permit activation, for example. The configuration of the control device 12 thus ensures that the microphone 20*a* cannot be activated unless the actuation device 22 has been detected as being in close proximity to or engagement with the apparatus 10. Once interaction with the apparatus 10 has been completed, or the user wishes for the microphone 20*a* to be inaccessible to third parties, the user simply takes the actuation device 22 far away from the apparatus 10. Similar operations are performed if the user wishes to activate the camera 20*b*, and/or the communication interface 20*c*. The configuration of the apparatus 10 thus provides security against unauthorised activation of the microphone 20*a* or camera 20*b*. Advantageously, in the context of the apparatus configured as a child's toy, a parent or child can visually see whether or not the actuation device 22 is engaged or close to the apparatus and thus immediately grasp/have certainty on whether the communication devices 20 have been disabled from activation.

It will be appreciated that, for embodiments in which the actuation device 22 is combined with the media object 15, the control device 12 will operate to detect the presence of the relevant actuation identifier keys 23*a-c*, before permitting actuation of the associated communication devices 20*a-c*.

In embodiments, the detection device 24 may be a magnetic field sensor, and the actuation device 22 may include a magnet, or be capable of producing a magnetic field (e.g. by an electric current flowing through the actuation device 22) for detection by the magnetic field sensor when the actuation device 22 is placed into close proximity to or physical contact with the interactive apparatus 10. In such embodiments, the control device 12 will only permit the communication device 20 to be activated if it has received a positive signal from the detection device 24 that the actuation device 22 has been detected. Operation of such embodiments will be similar to that of previously described embodiments.

In embodiments, the interactive apparatus 10 may include a switch device 26 operable between a first state to permit activation of one or more of the communication devices 20 and a second state to inhibit activation of the one or more of the communication devices 20, and the switch device 26 may be operated by the actuation device 22 being in close proximity to or engagement with the interactive apparatus 10. In such embodiments, the switch device 26 may form part of a control or power supply circuit for the communication devices 20 that may be isolated by the switch device 26 from the rest of the interactive apparatus 10 such that the communication devices 20 are inhibited from activation unless the circuit is connected by the switch device 26. The switch device 26 may be independent of the control device 12 and in such embodiments there may be no detection device 24 at all. An example of a switch device 26 includes a reed switch that is operated by sensing a magnetic field produced by the actuation device 22. The switch device 26 may thus operate without the requirement of a detection device 24 in embodiments because it will directly complete the control/power supply circuit on sensing the magnetic field produced by the actuation device 22. Operation of apparatus 10 according to such embodiments would be similar to that previously described except that if the user attempts to activate the communication devices 20, e.g. microphone 20*a* or camera 20*b*, the control device 12 simply cannot activate the devices 20 because the relevant control or power supply circuit is isolated if the switch device 22 is not in its first state. Thus, in such embodiments, the switch device 26 provides a robust layer of security against unauthorised access of the communication devices 20.

Figure 3:
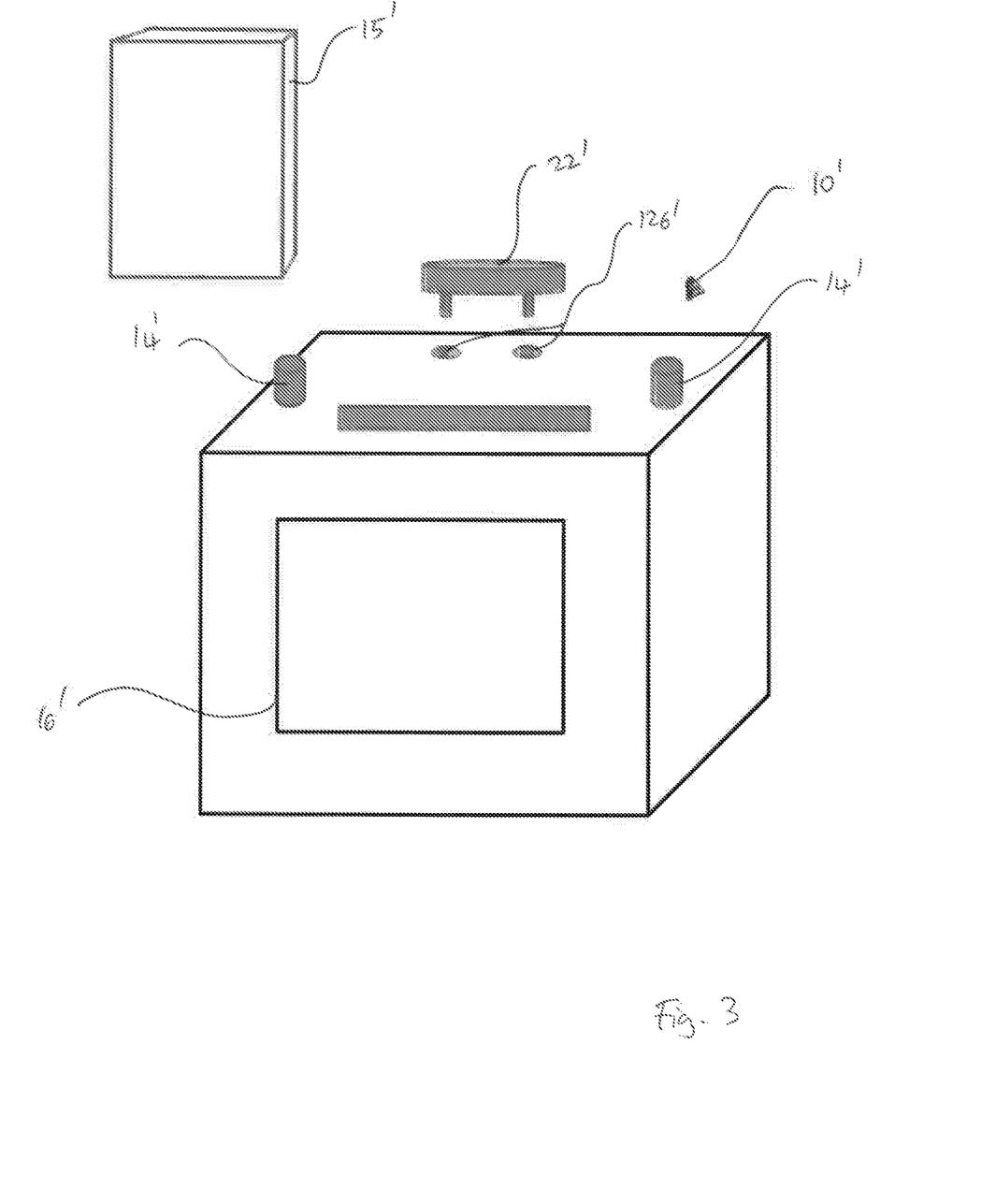
FIG. 3 is a perspective view of an interactive apparatus in accordance with embodiments of the present invention.

With reference to FIG. 3, in embodiments, other configurations of interactive apparatus 10' and actuation device 22' may be employed. Apparatus 10' may include a control device 12', input devices 14', output devices 16' and communication devices 20'. The control, input, output and communication devices 12', 14', 16', 20' may be of a similar configuration as in relation to the control, input and output devices previously described in relation to the embodiments of apparatus 10. For example, the interactive apparatus 10' may include a control or power supply circuit for one or more of the communication devices 20' that is isolated or independent from the rest of the interactive system 10'. The said circuit may have a pair of contact elements 126', e.g. provided at an external surface of the interactive apparatus 10', which must be connected by the actuation device 22' to close the circuit so that it permits control of and/or power to be supplied to the communication devices 20'. In such embodiments, the actuation device 22' may close the circuit by engaging with the pair of contact elements 126'. For example, the actuation device 22' may include a circuit element, e.g. a wire, which engages with the pair of contact elements 126' so as to close the circuit by bridging the contact elements 126'. It will be understood that the actuation device 22' provides a direct physical disconnect/connection of the communication devices 20' that is independent of the control device 12'. It will be appreciated how activation of communication devices 20' will not be possible by the control device 12' and/or input devices 14' unless the actuation device 22' is engaged. Thus, the described configuration provides protection against unauthorised access by third parties to the communication devices 20'.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. An interactive apparatus, the interactive apparatus including:
   a control device configured to control the interactive apparatus;
   one or more input components configured to receive one or more input and one or more output components configured to provide audio and/or visual outputs, wherein the control device is configured to receive media and provide the media to the one or more output components to provide the audio and/or visual outputs associated with the media; and
   one or more communication components configured to receive a communication input for processing by the control device, the one or more communication components including one or more of: a microphone, a camera, and a communication interface for communication with electronic or computer devices over a communications network, wherein the one or more communication components are not a part of the one or more input components and the one or more output components;
   wherein the interactive apparatus comprises the control device, the one or more input components, the one or more output components, and the one or more communication components, and wherein the one or more communication components are only permitted to be activated by an actuation device being placed into close proximity to or physical contact with the interactive apparatus.

2. The interactive apparatus of claim 1 wherein, when the interactive apparatus is in an operational state, the one or more communication components are only permitted to be activated by the actuation device being placed into the close proximity to or the physical contact with the interactive apparatus.

3. The interactive apparatus according to claim 1 wherein the actuation device is for permitting activation of the one or more communication components and operation of the rest of the interactive apparatus is otherwise independent of the actuation device.

4. The interactive apparatus of claim 1, further including a detection component configured to detect the actuation device.

5. The interactive apparatus of claim 4, wherein the one or more communication components are only permitted to be activated in response to the detection component detecting the actuation device is in the close proximity to or in the physical contact with the interactive apparatus.

6. The interactive apparatus of claim 4, wherein the one or more communication components are not permitted to be activated in response to the detection component detecting the actuation device is not in the close proximity to or not in the physical contact with the interactive apparatus.

7. The interactive apparatus of claim 4, wherein the actuation device includes a passive or active wireless communication tag for detection by the detection component, wherein the passive or active wireless communication tag is a Near Field Communication Tag (NFC Tag) or a Radio Frequency Identification Tag (RFID Tag).

8. The interactive apparatus of claim 4, wherein the detection component includes a magnetic field sensor, and the actuation device includes a magnet for detection by the magnetic field sensor when the actuation device is placed into the close proximity to or the physical contact with the interactive apparatus.

9. The interactive apparatus of claim 1, further including a switch device operable between a first state to activate the one or more communication components and a second state to deactivate the one or more communication components.

10. The interactive apparatus of claim 9, wherein the switch device is a reed switch which is operable by the actuation device being in the close proximity to or engagement with the interactive apparatus.

11. The interactive apparatus of claim 9 wherein the switch device is operable by the control device.

12. The interactive apparatus of claim 1, wherein the one or more input components include a reading device for reading a media identifier key present on a media object when said media object is placed into the close proximity to or the physical contact with the interactive apparatus.

13. The interactive apparatus of claim 12, wherein the control device is configured to use the media identifier key to obtain an associated media and provide said associated media to the one or more output components.

14. The interactive apparatus of claim 13 wherein the associated media may be stored on a computer readable medium of the interactive apparatus and/or may be stored on a remote computer from which the associated media may be downloaded.

15. The interactive apparatus of claim 1, further including a housing, wherein the housing includes a recess configured to receive the actuation device therein.

16. The interactive apparatus of claim 15, wherein the recess is provided on a surface of the housing which, in use, faces a user.

17. The interactive apparatus of claim 1 further including a computer readable medium storing the communication input received from the one or more communication components.

18. The interactive apparatus of claim 17, wherein the computer readable medium is a removable Secure Digital (SD) card.

19. The interactive apparatus of claim 1, wherein the one or more output components include a visual display and/or a speaker.

20. The interactive apparatus of claim 1, further including contact elements configured to engage with corresponding contact elements on the actuation device to close a circuit such that the one or more communication components are permitted to be activated.

21. The interactive apparatus of claim 1, further including a user operable device operable to activate and/or deactivate the one or more communication components.

22. The interactive apparatus of claim 1, wherein the one or more communication components are configured to deactivate when the actuation device is not in the close proximity or the physical contact with the interactive apparatus.

23. An interactive apparatus system including:
   an interactive apparatus, the interactive apparatus including:
      a control device configured to control the interactive apparatus;
      one or more input components configured to receive one or more input and one or more output components configured to provide audio and/or visual outputs, wherein the control device is configured to receive media and provide the media to the one or more output components to provide the audio and/or visual outputs associated with the media; and
      one or more communication components configured to receive a communication input for processing by the control device, the one or more communication components including one or more of: a microphone, a camera, and a communication interface for communication with electronic or computer devices over a communications network, wherein the one or more communication components are not a part of the one or more input components and the one or more output components, wherein the interactive apparatus comprises the control device, the one or more input components, the one or more output components, and the one or more communication components; and
   an actuation device, wherein the one or more communication components are only permitted to be activated by the actuation device being placed into close proximity to or physical contact with the interactive apparatus.

* * * * *